United States Patent
Madnani et al.

(10) Patent No.: US 8,819,478 B1
(45) Date of Patent: *Aug. 26, 2014

(54) AUTO-ADAPTING MULTI-TIER CACHE

(71) Applicant: EMC Corporation, Hopkinton, MA (US)

(72) Inventors: Kiran Madnani, Framingham, MA (US); David W. DesRoches, Methuen, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/048,952

(22) Filed: Oct. 8, 2013

Related U.S. Application Data

(63) Continuation of application No. 12/164,817, filed on Jun. 30, 2008, now Pat. No. 8,615,678.

(51) Int. Cl.
*G06F 11/00* (2006.01)
*G06F 11/16* (2006.01)

(52) U.S. Cl.
CPC ............................ *G06F 11/1666* (2013.01)
USPC ............ 714/5.1; 714/6.1; 714/6.23; 714/47.1

(58) Field of Classification Search
USPC .......... 714/6.1, 6.3, 6.23, 47.1, 5.1; 711/113, 711/118
See application file for complete search history.

(56) References Cited

U.S. PATENT DOCUMENTS

| | | | |
|---|---|---|---|
| 5,437,022 A | | 7/1995 | Beardsley et al. |
| 5,450,563 A | | 9/1995 | Gregor |
| 5,450,578 A | | 9/1995 | Mackenthun |
| 5,586,291 A | | 12/1996 | Lasker et al. |
| 5,724,501 A | | 3/1998 | Dewey et al. |
| 5,809,543 A | | 9/1998 | Byers et al. |
| 6,088,773 A | | 7/2000 | Kano et al. |
| 6,295,577 B1 | * | 9/2001 | Anderson et al. ............. 711/113 |
| 6,321,298 B1 | | 11/2001 | Hubis |
| 6,425,050 B1 | | 7/2002 | Beardsley et al. |
| 6,516,425 B1 | | 2/2003 | Belhadj et al. |
| 6,799,244 B2 | | 9/2004 | Tanaka et al. |
| 6,865,650 B1 | | 3/2005 | Morley et al. |
| 6,961,818 B1 | * | 11/2005 | Sade et al. .................... 711/119 |
| 6,965,979 B2 | | 11/2005 | Burton |
| 7,162,587 B2 | | 1/2007 | Hiken et al. |
| 7,210,061 B2 | | 4/2007 | Anderson |
| 7,302,526 B1 | | 11/2007 | Cartmell et al. |
| 7,328,364 B1 | | 2/2008 | Leong et al. |
| 7,337,353 B2 | | 2/2008 | Yamamoto et al. |
| 7,353,336 B2 | | 4/2008 | Gaither |
| 7,444,541 B2 | * | 10/2008 | Lubbers et al. ............. 714/5.11 |
| 7,464,288 B2 | | 12/2008 | Kaiya et al. |
| 7,500,070 B2 | * | 3/2009 | Schilling et al. ............. 711/162 |
| 7,502,955 B2 | | 3/2009 | Ishikawa et al. |

(Continued)

*Primary Examiner* — Loan L. T. Truong

(74) *Attorney, Agent, or Firm* — Brian J. Colandreo; Mark H. Whittenberger; Holland & Knight LLP

(57) ABSTRACT

A method, computer program product, and storage network system for detecting a failure of a highly-available, volatile, solid state cache memory system included within a storage network. The highly-available, volatile, solid state cache memory system includes cache data. The cache data is replicated onto a non-volatile, solid-state, cache memory system included within the storage network. At least one data request concerning the highly-available, volatile, solid state cache memory system is redirected to the non-volatile, solid-state, cache memory system.

27 Claims, 5 Drawing Sheets

(56) References Cited

U.S. PATENT DOCUMENTS

| | | | |
|---|---|---|---|
| 7,577,815 B2* | 8/2009 | Yamamoto et al. | 711/203 |
| 7,669,008 B2 | 2/2010 | Kubo et al. | |
| 7,734,582 B2* | 6/2010 | Paul et al. | 707/613 |
| 7,783,598 B1 | 8/2010 | Malaiyandi et al. | |
| 7,886,186 B2 | 2/2011 | Kumagai | |
| 7,890,795 B1* | 2/2011 | Madnani et al. | 714/6.2 |
| 7,941,728 B2 | 5/2011 | Emma et al. | |
| 8,099,554 B1 | 1/2012 | Solomon et al. | |
| 8,131,930 B1 | 3/2012 | Clark et al. | |
| 8,145,837 B2* | 3/2012 | Ballew et al. | 711/113 |
| 8,185,663 B2* | 5/2012 | Cochran et al. | 709/250 |
| 8,443,134 B2* | 5/2013 | Flynn | 711/103 |
| 8,489,820 B1* | 7/2013 | Ellard | 711/138 |
| 8,560,881 B2* | 10/2013 | Frost et al. | 714/6.2 |
| 2001/0002480 A1* | 5/2001 | Dekoning et al. | 711/130 |
| 2002/0133735 A1 | 9/2002 | McKean et al. | |
| 2003/0105928 A1 | 6/2003 | Ash et al. | |
| 2004/0059869 A1* | 3/2004 | Orsley | 711/114 |
| 2004/0064647 A1 | 4/2004 | DeWhitt et al. | |
| 2004/0210795 A1* | 10/2004 | Anderson | 714/6 |
| 2004/0236983 A1 | 11/2004 | Burton et al. | |
| 2004/0254954 A1 | 12/2004 | Gatto et al. | |
| 2005/0198411 A1 | 9/2005 | Bakke et al. | |
| 2005/0216788 A1 | 9/2005 | Mani-Meitav et al. | |
| 2006/0015767 A1 | 1/2006 | Sun Hsu et al. | |
| 2006/0075185 A1* | 4/2006 | Azzarito et al. | 711/113 |
| 2006/0168464 A1 | 7/2006 | Yuasa | |
| 2006/0174156 A1* | 8/2006 | Balasubramanian | 714/6 |
| 2006/0184736 A1 | 8/2006 | Benhase et al. | |
| 2006/0206665 A1* | 9/2006 | Orsley | 711/114 |
| 2006/0212644 A1* | 9/2006 | Acton et al. | 711/103 |
| 2006/0224849 A1* | 10/2006 | Rezaul Islam et al. | 711/170 |
| 2006/0248295 A1 | 11/2006 | Uchiyama et al. | |
| 2007/0011213 A1* | 1/2007 | Burton et al. | 707/204 |
| 2007/0061511 A1* | 3/2007 | Faber | 711/113 |
| 2007/0118695 A1* | 5/2007 | Lowe et al. | 711/136 |
| 2007/0162506 A1 | 7/2007 | Grosman et al. | |
| 2007/0168706 A1* | 7/2007 | Humlicek | 714/6 |
| 2008/0010409 A1 | 1/2008 | Rao et al. | |
| 2008/0065843 A1* | 3/2008 | Bartfai et al. | 711/162 |
| 2008/0082856 A1* | 4/2008 | French et al. | 714/2 |
| 2008/0104344 A1* | 5/2008 | Shimozono et al. | 711/162 |
| 2008/0144532 A1 | 6/2008 | Chamarajanagar et al. | |
| 2008/0201523 A1* | 8/2008 | Ash et al. | 711/113 |
| 2008/0222158 A1 | 9/2008 | Saika | |
| 2008/0276040 A1* | 11/2008 | Moritoki | 711/113 |
| 2008/0288605 A1* | 11/2008 | Major et al. | 709/207 |
| 2009/0031096 A1* | 1/2009 | Smith et al. | 711/162 |
| 2009/0132760 A1 | 5/2009 | Flynn et al. | |
| 2009/0132765 A1* | 5/2009 | Wang et al. | 711/120 |
| 2009/0172324 A1 | 7/2009 | Han et al. | |
| 2009/0249004 A1 | 10/2009 | Wang et al. | |
| 2009/0257184 A1 | 10/2009 | Lee et al. | |
| 2009/0300280 A1 | 12/2009 | Jutzi et al. | |
| 2009/0313252 A1 | 12/2009 | Gupta et al. | |

* cited by examiner

AUTO-ADAPTING MULTI-TIER CACHE

RELATED APPLICATIONS

The subject application is a continuation application of U.S. Patent Application with Ser. No. 12/164,817, filed on Jun. 30, 2008, the entire content of which is herein incorporated by reference

TECHNICAL FIELD

This disclosure relates to cache memory systems and methods and, more particularly, to auto-degrading cache memory systems and methods.

BACKGROUND

Storing and safeguarding electronic data is of paramount importance in modern business. Accordingly, various systems may be employed to protect such electronic data.

For example, storage networks may be employed that contain multiple storage devices. Storage networks may provide some level of redundancy by use of mirrored or redundant components (e.g., disk drives, disk controllers, power supplies and/or fans), each of which may be hot-swappable to avoid downtime. Storage networks may include a volatile, solid-state, cache memory system to enhance the performance of the storage network.

The use of solid-state disk drives in such storage networks is increasing in popularity. A solid state disk drive is a data storage device that uses solid-state memory to store persistent data. A solid-state disk drive may emulate (and therefore replace) a conventional hard disk drive. With no moving parts, a solid-state disk drive largely eliminates (or greatly reduces) seek time, latency and other electromechanical delays and failures associated with a conventional hard disk drive.

Unfortunately, the above-described volatile, solid-state, cache memory system included within the storage network may fail, resulting in a substantial decrease in performance of the storage network.

SUMMARY OF DISCLOSURE

According to a first implementation, a method includes detecting a failure of a highly-available, volatile, solid state cache memory system included within a storage network. The highly-available, volatile, solid state cache memory system includes cache data. The cache data is replicated onto a non-volatile, solid-state, cache memory system included within the storage network. At least one data request concerning the highly-available, volatile, solid state cache memory system is redirected to the non-volatile, solid-state, cache memory system.

One or more of the following implementations may be included. A backup copy of the cache data included on the highly-available, volatile, solid state cache memory system may be generated. The backup copy of cache data may be stored on a non-volatile, electromechanical memory system included within the storage network.

IO operations of the storage network may be suspended during generation of the backup copy of the cache data included on the highly-available, volatile, solid state cache memory system. The non-volatile, electromechanical memory system may include a RAID array. A write request may be received, on the storage network, concerning data to be stored on the storage network. The data may be written to the non-volatile, solid-state, cache memory system.

A read request may be received, on the storage network, concerning data previously stored on the storage network. If available on the non-volatile, solid-state, cache memory system, the data previously stored on the storage network may be retrieved from the non-volatile, solid-state, cache memory system. If not available on the non-volatile, solid-state, cache memory system, the data previously stored on the storage network may be retrieved from a non-volatile, electromechanical memory system included within the storage network. The non-volatile, solid-state, cache memory system may include a flash-based, cache memory system.

In another implementation, a computer program product resides on a computer readable medium that has a plurality of instructions stored on it. When executed by a processor, the instructions cause the processor to perform operations including detecting a failure of a highly-available, volatile, solid state cache memory system included within a storage network. The highly-available, volatile, solid state cache memory system includes cache data. The cache data is replicated onto a non-volatile, solid-state, cache memory system included within the storage network. At least one data request concerning the highly-available, volatile, solid state cache memory system is redirected to the non-volatile, solid-state, cache memory system.

One or more of the following implementations may be included. A backup copy of the cache data included on the highly-available, volatile, solid state cache memory system may be generated. The backup copy of cache data may be stored on a non-volatile, electromechanical memory system included within the storage network.

IO operations of the storage network may be suspended during generation of the backup copy of the cache data included on the highly-available, volatile, solid state cache memory system. The non-volatile, electromechanical memory system may include a RAID array. A write request may be received, on the storage network, concerning data to be stored on the storage network. The data may be written to the non-volatile, solid-state, cache memory system.

A read request may be received, on the storage network, concerning data previously stored on the storage network. If available on the non-volatile, solid-state, cache memory system, the data previously stored on the storage network may be retrieved from the non-volatile, solid-state, cache memory system. If not available on the non-volatile, solid-state, cache memory system, the data previously stored on the storage network may be retrieved from a non-volatile, electromechanical memory system included within the storage network. The non-volatile, solid-state, cache memory system may include a flash-based, cache memory system.

In another implementation, a data storage system includes a highly-available, volatile, solid-state, cache memory system; a non-volatile, electromechanical memory system; and a non-volatile, solid-state, cache memory system. The data storage system is configured to perform operations including detecting a failure of the highly-available, volatile, solid state cache memory system. The highly-available, volatile, solid state cache memory system includes cache data. The cache data is replicated onto the non-volatile, solid-state, cache memory system. At least one data request concerning the highly-available, volatile, solid state cache memory system is redirected to the non-volatile, solid-state, cache memory system.

One or more of the following implementations may be included. A backup copy of the cache data included on the highly-available, volatile, solid state cache memory system may be generated. The backup copy of cache data may be stored on a non-volatile, electromechanical memory system included within the storage network.

IO operations of the storage network may be suspended during generation of the backup copy of the cache data included on the highly-available, volatile, solid state cache memory system. The non-volatile, electromechanical memory system may include a RAID array. A write request may be received, on the storage network, concerning data to be stored on the storage network. The data may be written to the non-volatile, solid-state, cache memory system.

A read request may be received, on the storage network, concerning data previously stored on the storage network. If available on the non-volatile, solid-state, cache memory system, the data previously stored on the storage network may be retrieved from the non-volatile, solid-state, cache memory system. If not available on the non-volatile, solid-state, cache memory system, the data previously stored on the storage network may be retrieved from a non-volatile, electromechanical memory system included within the storage network. The non-volatile, solid-state, cache memory system may include a flash-based, cache memory system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
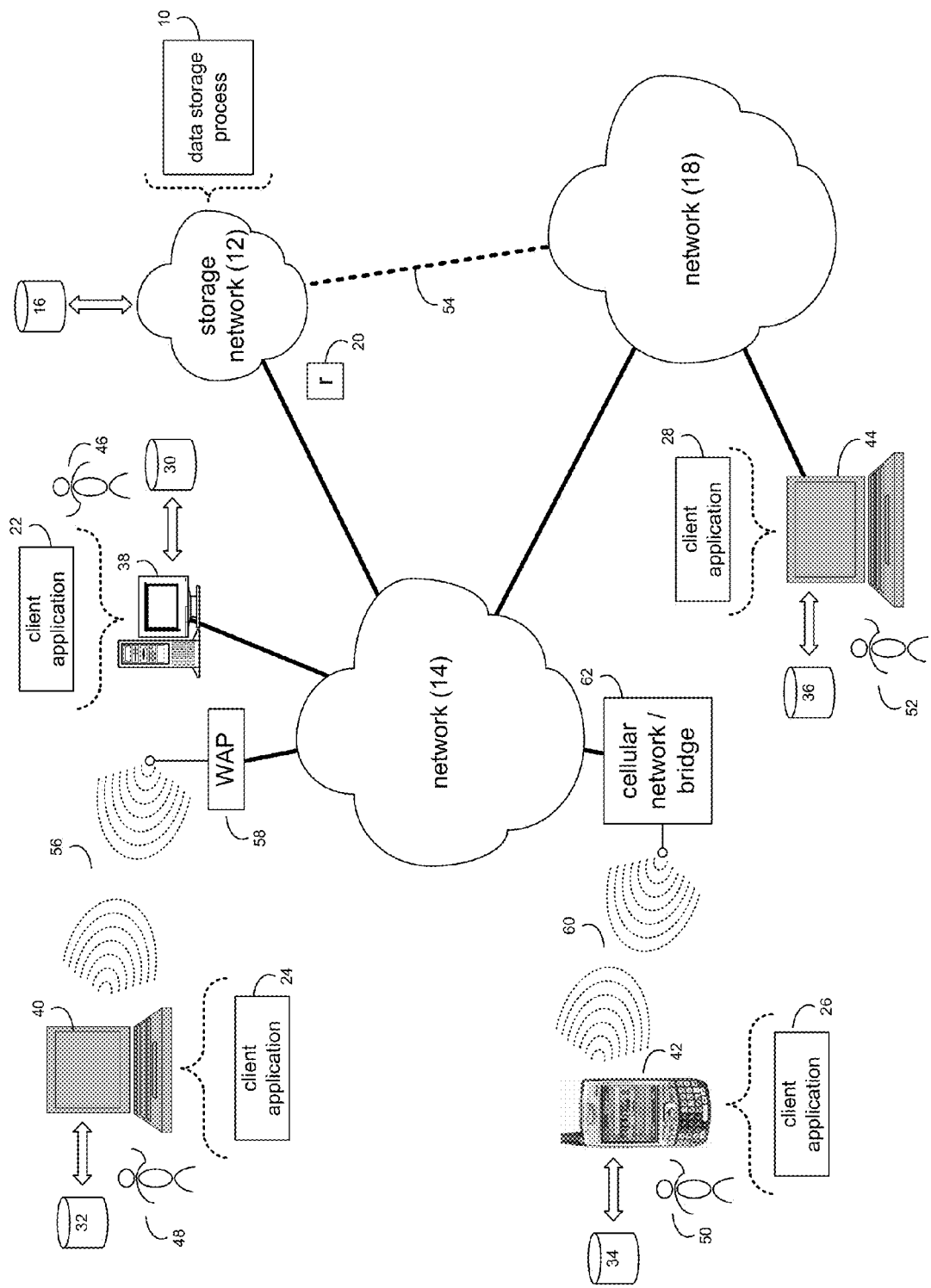
FIG. 1 is a diagrammatic view of a storage network and a data storage process coupled to a distributed computing network.

Referring to FIG. 1, there is shown data storage process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID device and a NAS system. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, data storage process 10 may detect a failure of a highly-available, volatile, solid state cache memory system included within a storage network. The highly-available, volatile, solid state cache memory system may include cache data. The cache data may be replicated onto a non-volatile, solid-state, cache memory system included within the storage network. At least one data request concerning the highly-available, volatile, solid state cache memory system may be redirected to the non-volatile, solid-state, cache memory system.

The instruction sets and subroutines of data storage process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID device; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data extent be written to storage network 12) and data read requests (i.e. a request that a data extent be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with link line 54 (shown in phantom).

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Data Storage Process:

For the following discussion, client application 22 is going to be described for illustrative purposes. However, this is not intended to be a limitation of this disclosure, as other client applications (e.g., client applications 24, 26, 28) may be equally utilized.

Figure 2:
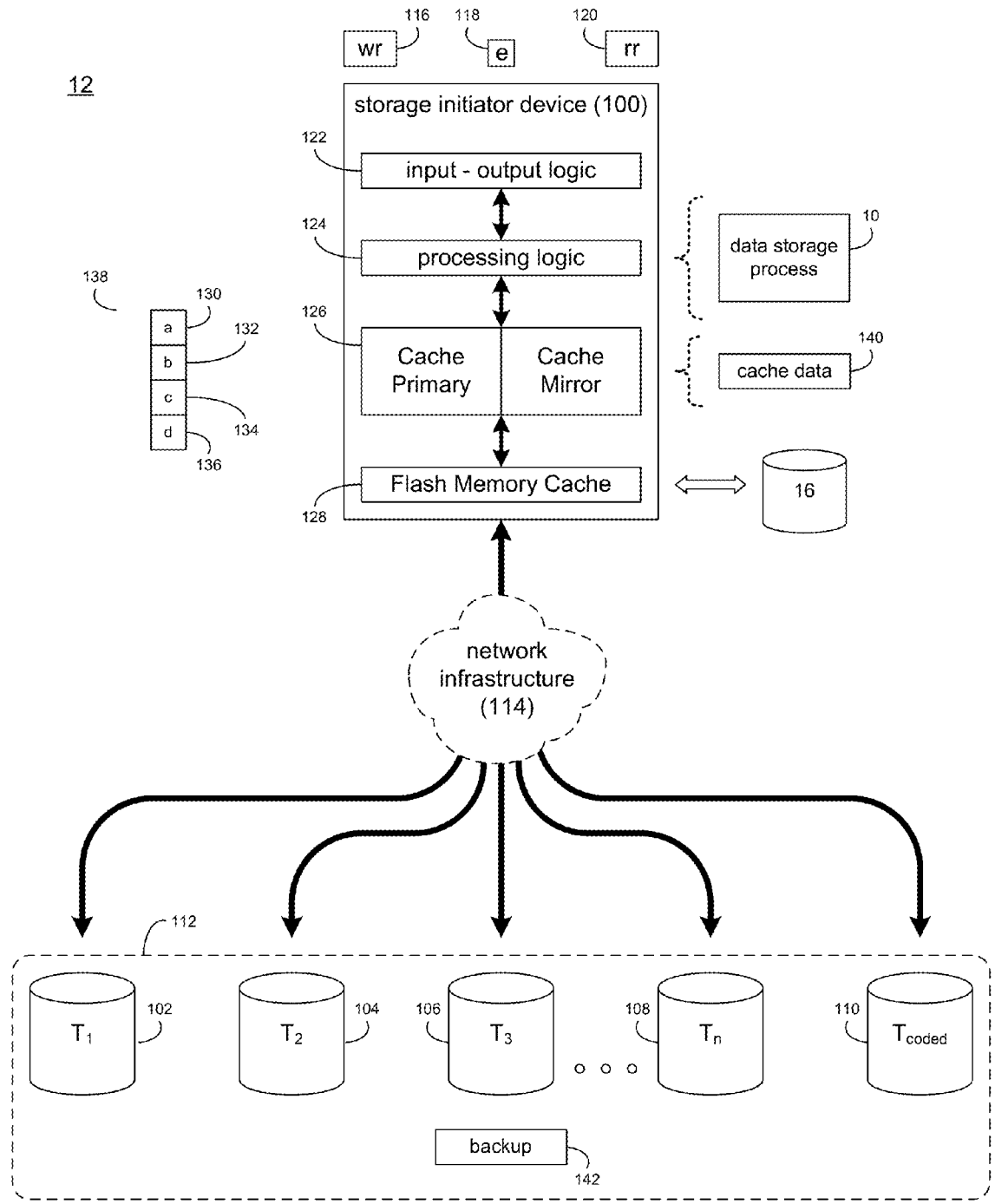
FIG. 2 is a diagrammatic view of the storage network of FIG. 1.

Referring also to FIG. 2, storage network 12 may include a storage initiator device (e.g. storage initiator device 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Additionally/alternatively, one or more of storage targets 102, 104, 106, 108 may be configured as a RAID 1 array, in which data is mirrored between storage targets. By mirroring data between storage targets, a level of high availability is achieved as multiple copies of the data are stored within storage network 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage network 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage network 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage network 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

A combination of storage targets 102, 104, 106, 108 and coded target 110 may form non-volatile, electromechanical memory system 112.

The manner in which storage network 12 is implemented may vary depending upon e.g. the level of redundancy/performance/capacity required. For example, storage network 12 may be a RAID device in which storage initiator device 100 is a RAID controller card and storage targets 102, 104, 106, 108 and/or coded target 110 are individual "hot-swappable" hard disk drives. An example of such a RAID device may include but is not limited to an NAS device. Alternatively, storage network 12 may be configured as a SAN, in which storage initiator device 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage network 12 is configured as a SAN, the various components of storage network 12 (e.g. storage initiator device 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The instruction sets and subroutines of data storage process 10, which may be stored on a storage device (e.g., storage device 16) coupled to storage initiator device 100, may be executed by one or more processors (not shown) and one or more memory architectures (not shown) included within storage initiator device 100. Storage device 16 may include but is not limited to: a hard disk drive; a tape drive; an optical drive; a RAID device; a random access memory (RAM); and a read-only memory (ROM).

As discussed above, various data requests (e.g. data request 20) may be sent from client applications 22, 24, 26, 28 to storage network 12, and examples of data request 20 may include but are not limited to data write request 116 (i.e. a request that data extent 118 be written to storage network 12) and data read request 120 (i.e. a request that data extent 118 be read from storage network 12).

As will be discussed below in greater detail, storage initiator device 100 may include input-output logic 122 (e.g., a network interface card), processing logic 124, volatile, solid-state, cache memory system 126 (e.g., a dynamic RAM cache memory system), and non-volatile, solid-state, cache memory system 128 (e.g., a flash-based, cache memory system).

During operation of storage initiator device 100, data (e.g. data extent 118) to be written to storage network 12 may be received by input-output logic 122 (e.g. from network 14 and/or network 18) and processed by processing logic 124. As will be discussed below in greater detail, processing logic 124 may initially store data extent 118 within volatile, solid-state, cache memory system 126, and may subsequently destage data extent 118 to non-volatile, solid-state, cache memory system 128 by gathering a plurality of data extents (e.g., data extent 118) within volatile, solid-state, cache memory system 126, apportioning the data extents into a plurality of data elements (e.g., data elements 130, 132, 134, 136), and destaging this plurality of data elements (e.g., data elements 130, 132, 134, 136) as a single data segment (e.g., data segment 138) to non-volatile, solid-state, cache memory system 128. Processing logic 124 may then destage data segment 138 to the storage targets (e.g. storage targets 102, 104, 106, 108) included within non-volatile, electromechanical memory system 112. Additionally, processing logic 124 may calculate and store coded data on coded target 110 (included within non-volatile, electromechanical memory system 112) that may allow for the regeneration of data lost/corrupted on one or more of storage targets 102, 104, 106, 108.

While not as fast as volatile, solid-state, cache memory system 126, non-volatile, solid-state, cache memory system 128 may be considerably quicker than non-volatile, electromechanical memory system 112. Accordingly, non-volatile, solid-state, cache memory system 128 may be sized so that the number of times that non-volatile, electromechanical memory system 112 is accessed may be reduced. Accordingly, by sizing non-volatile, solid-state, cache memory system 128 so that non-volatile, solid-state, cache memory system 128 retains a quantity of data sufficient to satisfy a significant quantity of data requests (e.g., data request 20), the overall performance of storage network 12 may be enhanced.

Figure 3:
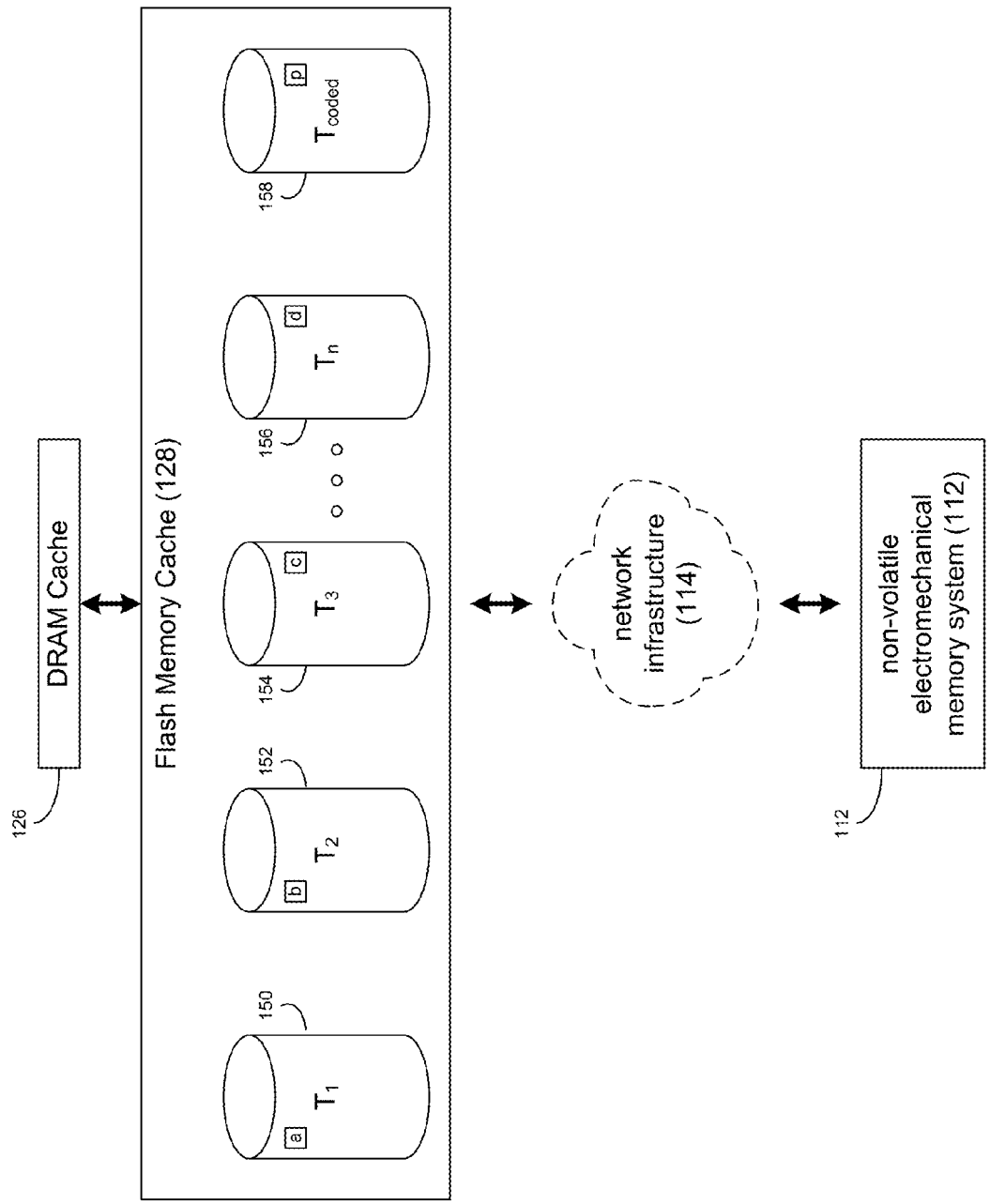
FIG. 3 is a diagrammatic view of a non-volatile, solid-state, cache memory system included within the storage network of FIG. 1.

Referring also to FIG. 3, non-volatile, solid-state, cache memory system 128 may include a plurality of flash solid-state storage devices (e.g. flash solid-state storage devices 150, 152, 154, 156, 158). The plurality of flash solid-state storage devices (e.g. flash solid-state storage devices 150, 152, 154, 156, 158) included within non-volatile, solid-state, cache memory system 128 may be configured as a RAID device that defines coded data.

Accordingly, one or more of the flash solid-state storage devices (e.g. flash solid-state storage devices 150, 152, 154, 156) may be configured as storage targets for storing various data portions received from volatile, solid-state, cache memory system 126 and/or non-volatile, electromechanical memory system 112. Further, one or more of the flash solid-state storage devices (e.g. flash solid-state storage device 158) may be configured as a coded target configured to store coded data that may allow for the regeneration of data portions lost/corrupted on e.g. flash solid-state storage devices 150, 152, 154, 156.

While non-volatile, solid-state, cache memory system 128 is described above as having a "dedicated" coded target (e.g. flash solid-state storage device 158), this is for illustrative purposes only and is not intended to be a limitation of this disclosure. Specifically, the coded target included within non-volatile, solid-state, cache memory system 128 may be a "distributed" coded target (as in a RAID 5 array), in that the coded element for a first data segment may be stored on a first physical device, the coded element for a second data segment may be stored on a second physical device, and the coded element for a third data segment may be stored on a third physical device. For example, for data segment 138, flash solid-state storage device 158 is described as storing coded element "p" and flash solid-state storage devices 150, 152, 154, 156 are described as storing data element "a", data element "b", data element "c", and data element "d" (respectively). However, for a subsequent data segment (data segment "x"; not shown), flash solid-state storage device 150 may be configured to store coded element "p" (for data segment "x") and flash solid-state storage devices 152, 154, 156, 158 may be configured to store data element "a", data element "b", data element "c", and data element "d" (for data segment "x"). Accordingly, data storage process 10 may vary the specific target assigned the task of storing the coded element depending upon the specific data segment being stored within non-volatile, solid-state, cache memory system 128. Therefore, by configuring non-volatile, solid-state, cache memory system 128 as a RAID 5 array, the above-described "write" reductions may be equally distributed across all of the flash solid-state storage devices included within non-volatile, solid-state, cache memory system 128 (as opposed to just flash solid-state storage device 158).

For illustrative purposes, assume that data extent 118 is to be written to non-volatile, solid-state, cache memory system 128. Data extent 118 may be received from volatile, solid-state, cache memory system 126 or from non-volatile, electromechanical memory system 112. For example, data extent 118 may be received from network 14 or network 18 for storage upon storage network 12. Upon being received by input-output logic 122, data storage process 10 (which may be executed on processing logic 124) may provide data extent 118 to volatile, solid-state, cache memory system 126. Volatile, solid-state, cache memory system 126 may maintain data extent 118 until data storage process 10 determines that data extent 118 has grown "cold". Data extent 118 may be deemed "cold" when input-output logic 122 has not read data extent 118 from volatile, solid-state, cache memory system 126 for a length of time sufficient to deem the continued storage of data extent 118 within volatile, solid-state, cache memory system 126 unnecessary.

Upon data storage process 10 determining that data extent 118 stored within volatile, solid-state, cache memory system 126 has grown "cold", data storage process 10 may destage data extent 118 to non-volatile, solid-state, cache memory system 128 by gathering a plurality of data extents (e.g., data extent 118) within volatile, solid-state, cache memory system 126, apportioning the data extents into a plurality of data elements (e.g., data elements 130, 132, 134, 136), and destaging this plurality of data elements (e.g., data elements 130, 132, 134, 136) as a single data segment (e.g., data segment 138) to non-volatile, solid-state, cache memory system 128. When destaging data segment 138 to non-volatile, solid-state, cache memory system 128, data storage process 10 may not erase data extent 118 from volatile, solid-state, cache memory system 126 and may merely allow data extent 118 to reside within both volatile, solid-state, cache memory system 126 and non-volatile, solid-state, cache memory system 128 simultaneously.

As is known in the art, when hard disk drives are configured in a RAIDS format, improved reliability may be realized (when compared to non-RAID configurations). However and as is known in the art, performing small random write operations within a RAIDS device is computationally costly and time consuming due to the required pre-read data/parity operations that are needed to compute new parity data for the RAIDS device. Often referred to as a "RAIDS Write Penalty", various companies have developed technology to minimize the impact of the "RAIDS Write Penalty". An example of such technology is disclosed in U.S. Pat. No. 6,865,650 to Morley et al and assigned to EMC Corporation of Hopkinton, Mass.; which is herein incorporated by reference. Such technology may reduce the impact of the "RAIDS Write Penalty" by deploying a "log-based RAID" approach to storing data within a RAID device.

As is known in the art, log-based RAID is the deployment of a Log-structured File System (LFS) onto a conventional RAID architecture, wherein log-style writing allows for the bundling of the data extents (e.g., data extent 118) from multiple small random input/output operations into fewer, larger, data chunks called data elements (e.g., data elements 130, 132, 134, 136) which are destaged as a single data segment (e.g., data segment 138). These data segments may be written to remappable locations on the storage device. By making the size of the data segment align with the stripe size of the RAIDS formatted device, data may be written log-style to the RAIDS device in whole stripes, thus reducing the impact of the above-described "RAIDS Write Penalty".

Data storage process 10 may be configured to utilize such technology. Accordingly, non-volatile, solid-state, cache memory system 128 may be configured as a log-based RAIDS device positioned between volatile, solid-state, cache memory system 126 and non-volatile, electromechanical memory system 112. The above-described log may be stored upon non-volatile, solid-state, cache memory system 128 and written to in whole-stripe-sized segments, and thus volatile, solid-state, cache memory system 126 may not experience the above-described "RAIDS Write Penalty" when volatile, solid-state, cache memory system 126 destages data to non-volatile, solid-state, cache memory system 128 (i.e., when configured as a log-based RAIDS device). Non-volatile, solid-state, cache memory system 128 may then cache data on the premise that a significant ratio of data may be overwritten before needing to be destaged from non-volatile, solid-state, cache memory system 128 to non-volatile, electromechanical memory system 112, thus avoiding costly RAIDS write operations to non-volatile, electromechanical memory system 112.

As a further example, data segment 138 may be provided to non-volatile, solid-state, cache memory system 128 from non-volatile, electromechanical memory system 112 via network infrastructure 114 for storage within non-volatile, solid-state, cache memory system 128.

For illustrative purposes, assume that data segment 138 is an eight-kilobyte data segment that includes four two-kilobyte data elements, namely data element "a", data element "b", data element "c", and data element "d".

Figure 4:
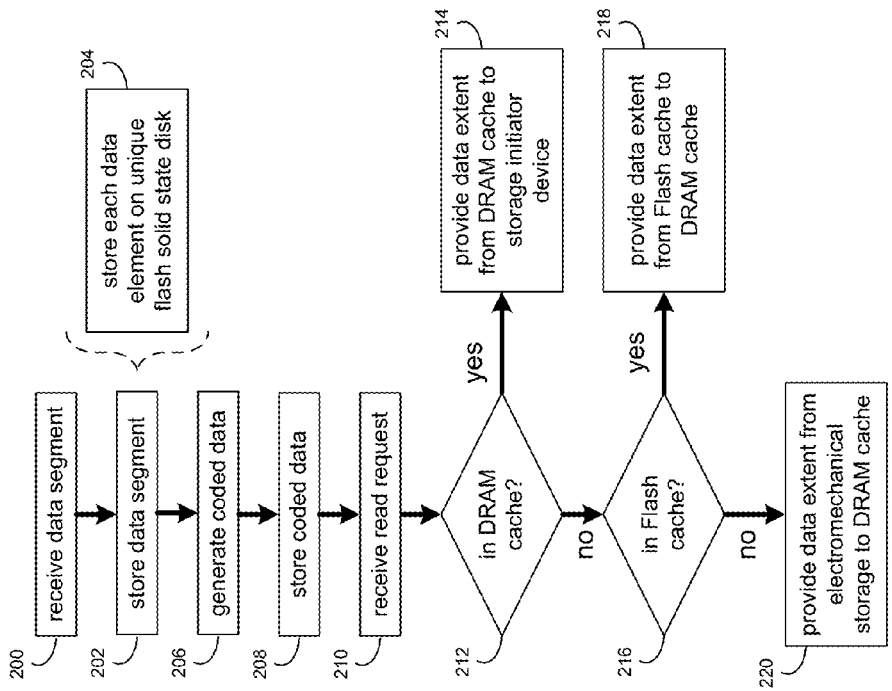
FIG. 4 is a flowchart of the data storage process of FIG. 1.

Referring also to FIG. 4, upon receiving 200 data segment 138 from e.g., volatile, solid-state, cache memory system 126 or non-volatile, electromechanical memory system 112, data storage process 10 may store 202 data segment 138 on non-volatile, solid-state, cache memory system 128.

As discussed above, one or more of the flash solid-state storage devices (e.g. flash solid-state storage devices 150, 152, 154, 156) included within non-volatile, solid-state, cache memory system 128 may be configured as storage targets for storing various data portions received from volatile, solid-state, cache memory system 126 and/or non-volatile, electromechanical memory system 112.

Continuing with the above-stated example in which data segment 138 includes four two-kilobyte data elements, namely data element "a", data element "b", data element "c", and data element "d", when storing 202 data segment 138 within non-volatile, solid-state, cache memory system 128, each data element of data segment 138 may be stored 204 within a unique flash solid-state storage device chosen from the plurality of flash solid-state storage devices (e.g. flash solid-state storage devices 150, 152, 154, 156). For example, data element "a" may be stored 204 within flash solid-state storage device 150; data element "b" may be stored 204 within flash solid-state storage device 152; data element "c" may be stored 204 within flash solid-state storage device 154; and data element "d" may be stored 204 within flash solid-state storage device 156.

As discussed above, one or more of the flash solid-state storage devices (e.g. flash solid-state storage device 158) may be configured as a coded target configured to store coded data that may allow for the regeneration of data portions lost/corrupted on e.g. flash solid-state storage devices 150, 152, 154, 156. As will be discussed below in greater detail, data storage process 10 may generate 206 coded data (e.g., coded element "p") based upon data element "a", data element "b", data element "c", and data element "d" which were stored 204 upon flash solid-state storage devices 150, 152, 154, 156 respectively. The coded data (e.g., coded element "p") generated 206 may be stored 208 upon flash solid-state storage device 158.

As will be discussed below in greater detail, when storing 208 the coded data (e.g. coded element "p"), the coded data may be stored 208 on coded target 158 only a single time for each time a complete data segment (e.g., data segment 138) is stored 204 on flash solid-state storage devices 150, 152, 154, 156 respectively, thus reducing the number of write operations executed upon non-volatile, solid-state, cache memory system 128.

Concerning the coded data (e.g., coded element "p"), when designing a storage network (e.g. storage network 12) to be highly available for data redundancy, high availability may be achieved by either mirroring data, using coded data, or via a combination of both. Data mirroring is essentially maintaining a real-time (or essentially real-time) redundant copy of the data on a separate hard disk drive (or data storage system). Accordingly, when mirroring data that is "striped" across a plurality of hard disk drives (via the use of e.g. a plurality of data elements), the number of hard disk drives required to construct the storage network is the product of the number of "striped" drives and the desired number of data "mirrors".

By using coded data, the total number of drives required to obtain the desired level of high availability may be reduced. Specifically, a single parity drive may be used to provide high availability for a plurality of storage targets. For example, non-volatile, solid-state, cache memory system 128 is shown to include four flash solid-state storage devices, namely flash solid-state storage device 150, flash solid-state storage device 152, flash solid-state storage device 154, and flash solid-state storage device 156. Accordingly, coded target 158 may be configured as a "parity" drive for storing "parity" data (i.e., a type of coded data) that may provide a level of high availability for flash solid-state storage devices 150, 152, 154, 156.

While non-volatile, solid-state, cache memory system 128 is shown to include a single coded target (e.g. coded target 158), this is for illustrative purposes only and is not intended to be a limitation of this disclosure. For example, the number of coded targets may be increased to provide an enhanced level of high availability. For example, a plurality of coded targets may be utilized with one or more highly-tolerant, error correction algorithms, such as the Reed-Solomon error correction algorithm and the Low-Density, Parity-Check code (i.e. LDPC code) error correction algorithm.

When storing 204 the unique data elements (e.g., data element "a", data element "b", data element "c", or data element "d") and storing 208 the coded data (e.g., coded element "p") of data segment 138 on each of flash solid-state storage devices 150, 152, 154, 156, 158 (respectively), the unique data elements and the unique coded element may be stored in a manner that facilitates easy retrieval (e.g., during read requests for data extents within data segment 138). For example, each data element and coded element may be stored at the same memory address on each of flash solid-state storage devices 150, 152, 154, 156, 158. Specifically, when the four two-kilobyte data elements (e.g., data element "a", data element "b", data element "c", and data element "d") of eight-kilobyte data segment 138 are stored 204 on flash solid-state storage devices 150, 152, 154, 156 and the two-kilobyte coded element (e.g., coded element "p") of eight-kilobyte data segment 138 is generated 206 and stored 208 on flash solid-state storage device 158, each two-kilobyte data element and coded element may be stored at the same memory address within each of flash solid-state storage devices 150, 152, 154, 156, 158.

As discussed above, when storing 208 the coded data (e.g. coded element "p"), the coded data may be stored 208 on coded target 158 only a single time for each time a complete data segment (e.g., data segment 138) is stored 204 on flash solid-state storage devices 150, 152, 154, 156 respectively. Accordingly, upon data segment 138 being received 200 by non-volatile, solid-state, cache memory system 128, data storage process 10 may store 204 data element "a" on flash solid-state storage device 150; may store 204 data element "b" on flash solid-state storage device 152; may store 204 data element "c" on flash solid-state storage device 154; and may store 204 data element "d" on flash solid-state storage device 156. Only once the storage 204 of the four data elements (namely data element "a", data element "b", data element "c", and data element "d") has been completed will coded element "p" be stored 208 on flash solid-state storage device 158 (i.e., the coded target). Additionally/alternatively, coded element "p" may be stored 208 at the same time that data element "a", data element "b", data element "c" and data element "d" are stored 204. As discussed above, by only writing coded element "p" to flash solid-state storage device 158 once (i.e., as opposed to, in this example, four times), the number of write operations executed upon flash solid-state storage device 158 is reduced by the following ratio:

$$\text{ratio} = \left(\frac{\#fssd(\text{data}) - 1}{\#fssd(\text{data})}\right) = \frac{4-1}{4} = 75\%$$

Upon receiving 210, on storage initiator device 100, a data read request (e.g., data read request 120) for a data extent that had been previously-stored within storage network 12, data storage process 10 may examine volatile, solid-state, cache memory system 126 to determine 212 if the previously-stored data extent is stored within volatile, solid-state, cache memory system 126.

If 212 the previously-stored data extent is stored within volatile, solid-state, cache memory system 126, data storage process 10 may provide 214 the previously-stored data extent from volatile, solid-state, cache memory system 126 to storage initiator device 100.

If 212 the previously-stored data extent is not stored within volatile, solid-state, cache memory system 126, data storage process 10 may examine non-volatile, solid-state, cache memory system 128 to determine 216 if the previously-stored data extent is stored within non-volatile, solid-state, cache memory system 128.

If 216 the previously-stored data extent is stored within non-volatile, solid-state, cache memory system 128, data storage process 10 may provide 218 the previously-stored data extent from non-volatile, solid-state, cache memory system 128 to volatile, solid-state, cache memory system 126.

If 216 the previously-stored data extent is not stored within non-volatile, solid-state, cache memory system 128, data storage process 10 may provide 220 the previously-stored data extent from non-volatile, electromechanical memory system 112 to volatile, solid-state, cache memory system 126. By providing the previously-stored data extent directly from non-volatile, electromechanical memory system 112 to volatile, solid-state, cache memory system 126 (thus bypassing non-volatile, solid-state, cache memory system 128), the number times that data is written to non-volatile, solid-state, cache memory system 128 is reduced.

Figure 5:
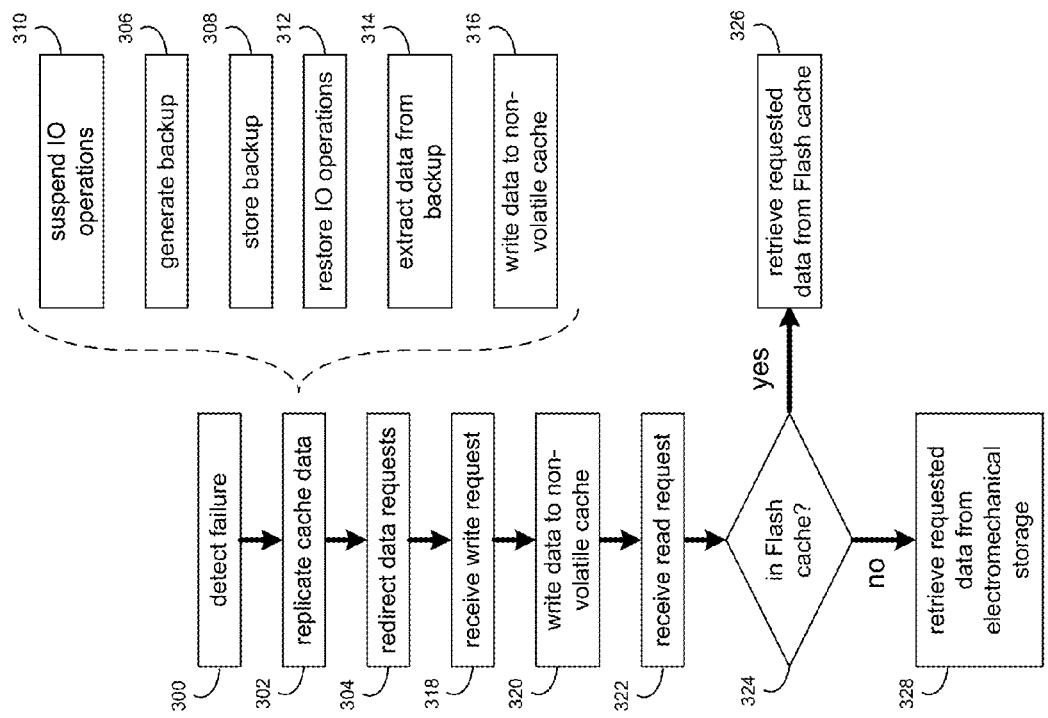
FIG. 5 is a flowchart of the data storage process of FIG. 1.

The Auto-Degrading Process:

Referring also to FIG. 5 and as discussed above, storage network 12 may include volatile, solid-state, cache memory system 126. Volatile, solid-state, cache memory system 126 may be configured in a manner that allows for a high level of availability. For example, volatile, solid-state, cache memory system 126 may include a "Cache Primary" portion that is mirrored (i.e., RAID 1) onto a "Cache Mirror" portion. The "Cache Mirror" portion of volatile, solid-state, cache memory system 126 may be controlled by e.g., a separate memory controller (when compared to the "Cache Primary" portion of volatile, solid-state, cache memory system 126) to further enhance the level of high availability.

As discussed above, data storage process 10 may detect 300 a failure of highly-available, volatile, solid state cache memory system 126 included within storage network 12. For example, the "Cache Primary" portion or the "Cache Mirror" portion of volatile, solid-state, cache memory system 126 may fail. Since "Cache Primary" portion and "Cache Mirror" portion of volatile, solid-state, cache memory system 126 are highly-available (e.g., mirrored), each of "Cache Primary" portion and "Cache Mirror" portion contain a copy of cache data 140.

Specifically and for illustrative purposes, assume that highly-available, volatile, solid state cache memory system 126 suffers a component-based failure, rendering the "Cache Primary" portion of highly-available, volatile, solid state cache memory system 126 non-accessible. Upon detecting 300 the failure of the "Cache Primary" portion of volatile, solid state cache memory system 126, data storage process 10 may access the "Cache Mirror" portion of volatile, solid state cache memory system 126, which (as discussed above) includes a copy of cache data 140.

Data storage process 10 may begin replicating 302 cache data 140 onto non-volatile, solid-state, cache memory system 128 included within storage network 12. Once replication 302 is complete, non-volatile, solid-state, cache memory system 128 may perform the functionality of volatile, solid state cache memory system 126 (which has failed) until highly-available, volatile, solid state cache memory system 126 is once again operational.

Accordingly, data storage process 10 may redirect 304 data requests (e.g., write request 116 or read request 120) concerning highly-available, volatile, solid state cache memory system 126 to non-volatile, solid-state, cache memory system 128.

When replicating 302 cache data 140 onto non-volatile, solid-state, cache memory system 128, data storage process 10 may generate 306 backup copy 142 of cache data 140. Specifically, assuming that cache data 140 includes data extents "A-L", data storage process 10 may generate 306 backup copy 142 that includes data extents "A-L". Once generated 306, backup copy 142 of cache data 140 may be stored 308 on non-volatile, electromechanical memory system 112.

While generating 306 backup copy 142 of cache data 140, data storage process 10 may suspend 310 IO operations of storage network 12. For example, in the event that e.g., write request 116 and/or read request 120 are received by storage network 12 subsequent to detecting the failure of highly-available, volatile, solid state cache memory system 126 (and prior to the complete generation of backup copy 142 of cache data 140), such request(s) may not be serviced by data storage process 10. For example, data storage process 10 may notify the requestor (e.g., client application 22) that data storage process 10 is temporarily unavailable. Alternatively, data storage process 10 may simply not acknowledge receipt of the request or may not confirm that the request was processed by data storage process 10. Accordingly, upon receiving a notification that data storage process 10 is unavailable (or not being notified that the request in question was received and/or processed), client application 22 may e.g., queue the request for subsequent resubmission to data storage process 10.

Once backup 142 is generated 306, IO operations of storage network 12 may be restored 312. Once IO operations are restored, data requests concerning highly-available, volatile, solid state cache memory system 126 may be redirected 304 to non-volatile, solid-state, cache memory system 128.

Map databases may be maintained that define the location of the various data extents within highly-available, volatile, solid state cache memory system 126 and within non-volatile, solid-state, cache memory system 128. Accordingly, when generating 306 backup 142, data storage process 10 may utilize the map database associated with volatile, solid state cache memory system 126 to locate and extract data extents "A-L" from volatile, solid state cache memory system 126 to generate 306 backup 142.

Once backup 142 is generated 306, data storage process 10 may utilize backup 142 to replicate 302 cache data 140 onto non-volatile, solid-state, cache memory system 128. For example, data storage process 10 may extract 314 data from backup 142 and write 316 the extracted data onto non-volatile, solid-state, cache memory system 128. For example, data storage process 10 may sequentially extract 314 data extents "A-L" from backup 142 and may sequentially write 316 extracted data extents "A-L" to non-volatile, solid-state, cache memory system 128.

When extracting 314 data extents from backup 142 and writing 316 the extracted data extents to non-volatile, solid-state, cache memory system 128, data storage process 10 may determine if the data extent being written to non-volatile, solid-state, cache memory system 128 is already stored within non-volatile, solid-state, cache memory system 128. Due to the manner in which data is destaged from volatile, solid state cache memory system 126 to non-volatile, solid-state, cache memory system 128 and then to non-volatile, electromechanical memory system 112 (as discussed above), the data stored within volatile, solid state cache memory system 126 represents the most up to date version of the data. Accordingly, if the data extent being written to non-volatile, solid-state, cache memory system 128 was previously stored within non-volatile, solid-state, cache memory system 128, data storage process 10 may overwrite the version of the data that was previously stored on non-volatile, solid-state, cache memory system 128 with the version of the data that was extracted 314 from backup 142.

As discussed above, a map database may be maintained that defines the location of the various data extents within non-volatile, solid-state, cache memory system 128. Accordingly, when data storage process 10 extracts 314 data from backup 142 and writes 316 the extracted data onto non-volatile, solid-state, cache memory system 128, data storage process 10 may update the map database for non-volatile, solid-state, cache memory system 128. Therefore, once data storage process 10 extracts 314 data extent "A" from backup 142 and writes 316 data extent "A" to non-volatile, solid-state, cache memory system 128, data storage process 10 may update the map database for non-volatile, solid-state, cache memory system 128 to locate data extent "A" within non-volatile, solid-state, cache memory system 128. This process of updating the map database for non-volatile, solid-state, cache memory system 128 may be repeated each time that data storage process 10 extracts 314 and writes 316 a data extent to non-volatile, solid-state, cache memory system 128.

As discussed above, data storage process 10 may redirect 304 data requests (e.g., write request 116 or read request 120) concerning highly-available, volatile, solid state cache memory system 126 to non-volatile, solid-state, cache memory system 128.

If a write request is received 318 on storage network 12 during the above-described replication process of cache data 140 onto non-volatile, solid-state, cache memory system 128, data storage process 10 may write 320 the data to non-volatile, solid-state, cache memory system 128.

For illustrative purposes, assume that write request 116 is received 318 by storage network 12, requesting that data extent "M" be written to volatile, solid state cache memory system 126 (which has failed). Accordingly, data storage process 10 may write 320 data extent "M" to non-volatile, solid-state, cache memory system 128 and may update the map database for non-volatile, solid-state, cache memory system 128 to locate data extent "M" within non-volatile, solid-state, cache memory system 128.

If a read request is received 322 on storage network 12 during the above-described replication process of cache data 140 onto non-volatile, solid-state, cache memory system 128, data storage process 10 may determine 324 if the data requested is available on non-volatile, solid-state, cache memory system 128. If the data requested is available on non-volatile, solid-state, cache memory system 128, data storage process 10 may retrieve 326 the requested data from non-volatile, solid-state, cache memory system 128. If not available on non-volatile, solid-state, cache memory system 128, data storage process 10 may retrieve the requested data from non-volatile, electromechanical memory system 112.

For illustrative purposes, assume that data storage process 10 is in the process of replicating 302 cache data 140 onto non-volatile, solid-state, cache memory system 128. Further assume that data extents "A-D" have been replicated to non-volatile, solid-state, cache memory system 128 and that data extents "E-L" have not yet been replicated to non-volatile, solid-state, cache memory system 128. Assume that read request 120 is received 322 by storage network 12, requesting that data extent "G" be read from volatile, solid state cache memory system 126 (which has failed). Accordingly, data storage process 10 may determine 324 if data extent "G" is available on non-volatile, solid-state, cache memory system 128. Since (as discussed above) data extents "E-L" have not yet been replicated to non-volatile, solid-state, cache memory system 128, data extent "G" cannot be retrieved 326 from non-volatile, solid-state, cache memory system 128. Accordingly, data storage process 10 may retrieve 328 data extent "G" from non-volatile, electromechanical memory system 112. Specifically, data storage process 10 may extract 314 data extent "G" from backup 142 and write 316 data extent "G" to non-volatile, solid-state, cache memory system 128. Once written to non-volatile, solid-state, cache memory system 128, data storage process 10 may fulfill read request 120 and provide data extent "G" to the requestor (e.g., client application 22).

As discussed above, a map database may be maintained that define the location of the various data extents within non-volatile, solid-state, cache memory system 128. Accordingly, when data storage process 10 writes 316 data extent "G" to non-volatile, solid-state, cache memory system 128, data storage process 10 may update the map database to define the location of data extent "G" within non-volatile, solid-state, cache memory system 128.

While various portions of the above-described system are described as being RAID 0, RAID 1, RAID 4 and RAID 5, this is for illustrative purposes only and is not intended to be a limitation of this disclosure. Specifically, the various portions of the above-described system may be configured using one or more standard RAID levels or one or more custom RAID levels.

For example, non-volatile, solid-state, cache memory system 128 may be configured using a variety of RAID levels. As discussed below, non-volatile, solid-state, cache memory system 128 may be configured dynamically (i.e., the data may be written to non-volatile, solid-state, cache memory system 128 using the RAID level that best suits the particular type of data being written).

SYSTEM METADATA may be small IOs (e.g., data extent 118) that need redundancy, but are not easily gathered into a data segment due to their small size and their function as data descriptors (e.g., system metadata often describes remapped data). Accordingly, data storage process 10 may write system metadata extents to non-volatile, solid-state, cache memory system 128 using a RAID 1 format.

CLEAN USER DATA: Clean user data extents may be gathered into data segments that do not require redundancy in the cache. Accordingly, data storage process 10 may write clean user data extents to non-volatile, solid-state, cache memory system 128 as a data segment using a RAID 0 format.

DIRTY USER DATA: Dirty user data extents may be gathered into data segments, but (unlike clean user data extents) does require redundancy. Accordingly, data storage process 10 may write dirty user data extents to non-volatile, solid-state, cache memory system 128 as a data segment using a log-style, full-stripe RAID 5 write operation (as discussed above and as disclosed in U.S. Pat. No. 6,865,650 to Morley et al and assigned to EMC Corporation of Hopkinton, Mass.).

While the system is described above as including a comparatively large number of storage devices, other configurations are possible and are considered to be within the scope of this disclosure. For example, the above-described system may be initially configured to include only two storage devices that are configured as a mirrored pair. As such, any data that is written to the first drive of the mirrored pair is also written to the second drive of the mirrored pair. Accordingly, in the event of a failure of one drive of the mirrored pair of drives, data storage process 10 may write from non-volatile, solid-state, cache memory system 128 to non-volatile, electromechanical memory system 112 any data that was not already stored on non-volatile, electromechanical memory system 112. Accordingly and in the event of such a failure, non-volatile, solid-state, cache memory system 128 may e.g., function as a read cache for non-volatile, electromechanical memory system 112.

A number of implementations have been described. Nevertheless, it will be understood that various modifications may be made. Accordingly, other implementations are within the scope of the following claims.

What is claimed is:

1. A method comprising:
    detecting a failure of a cache primary portion or a cache mirror portion of a highly-available, volatile, solid-state cache memory system included within a storage network, wherein the highly-available, volatile, solid-state cache memory system includes cache data, wherein each of the cache primary portion and the cache mirror portion contain a copy of cache data;
    upon detection of the failure of the cache primary portion or the cache mirror portion of the highly-available, volatile, solid-state cache memory system:
        replicating the cache data onto a non-volatile, solid-state cache memory system included within the storage network; and
        redirecting at least one data request concerning the highly-available, volatile, solid-state cache memory system to the non-volatile, solid-state cache memory system.

2. The method of claim 1 further comprising:
    generating a backup copy of the cache data included on the highly-available, volatile, solid-state cache memory system.

3. The method of claim 2 further comprising:
    storing the backup copy of cache data on a non-volatile, electromechanical memory system included within the storage network.

4. The method of claim 2 further comprising:
    suspending JO operations of the storage network during generation of the backup copy of the cache data included on the highly-available, volatile, solid-state cache memory system.

5. The method of claim 2 wherein the non-volatile, electromechanical memory system includes a RAID array.

6. The method of claim 1 further comprising:
    receiving, on the storage network, a write request concerning data to be stored on the storage network; and
    writing the data to the non-volatile, solid-state cache memory system.

7. The method of claim 1 further comprising:
    receiving, on the storage network, a read request concerning data previously stored on the storage network; and
    if available on the non-volatile, solid-state cache memory system, retrieving the data previously stored on the storage network from the non-volatile, solid-state cache memory system.

8. The method of claim 7 further comprising:
    if not available on the non-volatile, solid-state cache memory system, retrieving the data previously stored on the storage network from a non-volatile, electromechanical memory system included within the storage network.

9. The method of claim 1 wherein the non-volatile, solid-state cache memory system includes a flash-based, cache memory system.

10. A computer program product residing on a non-transitory computer readable medium having a plurality of instructions stored thereon which, when executed by a processor, cause the processor to perform operations comprising:
    detecting a failure of a cache primary portion or a cache mirror portion of a highly-available, volatile, solid-state cache memory system included within a storage network, wherein the highly-available, volatile, solid-state cache memory system includes cache data, wherein each of the cache primary portion and the cache mirror portion contain a copy of cache data;
    upon detection of the failure of the cache primary portion or the cache mirror portion of the highly-available, volatile, solid-state cache memory system:
        replicating the cache data onto a non-volatile, solid-state cache memory system included within the storage network; and
        redirecting at least one data request concerning the highly-available, volatile, solid-state cache memory system to the non-volatile, solid-state cache memory system.

11. The computer program product of claim 10 further comprising:
    generating a backup copy of the cache data included on the highly-available, volatile, solid-state cache memory system.

12. The computer program product of claim 11 further comprising instructions for:
    storing the backup copy of cache data on a non-volatile, electromechanical memory system included within the storage network.

13. The computer program product of claim 11 further comprising instructions for:
    suspending IO operations of the storage network during generation of the backup copy of the cache data included on the highly-available, volatile, solid-state cache memory system.

14. The computer program product of claim 11 wherein the non-volatile, electromechanical memory system includes a RAID array.

15. The computer program product of claim 10 further comprising instructions for:
    receiving, on the storage network, a write request concerning data to be stored on the storage network; and
    writing the data to the non-volatile, solid-state cache memory system.

16. The computer program product of claim 10 further comprising instructions for:
- receiving, on the storage network, a read request concerning data previously stored on the storage network; and
- if available on the non-volatile, solid-state cache memory system, retrieving the data previously stored on the storage network from the non-volatile, solid-state cache memory system.

17. The computer program product of claim 16 further comprising instructions for:
- if not available on the non-volatile, solid-state cache memory system, retrieving the data previously stored on the storage network from a non-volatile, electromechanical memory system included within the storage network.

18. The computer program product of claim 10 wherein the non-volatile, solid-state cache memory system includes a flash-based, cache memory system.

19. A storage network system comprising:
- a highly-available, volatile, solid-state cache memory system including a cache primary portion and a cache mirror portion, wherein each of the cache primary portion and the cache mirror portion contain a copy of cache data;
- a non-volatile, electromechanical memory system; and
- a non-volatile, solid-state cache memory system;
- wherein the data storage system is configured to perform operations comprising:
  - detecting a failure of the cache primary portion or the cache mirror portion of the highly-available, volatile, solid-state cache memory system, wherein the highly-available, volatile, solid-state cache memory system includes the cache data;
  - upon detection of the cache primary portion or the cache mirror portion of the failure of the highly-available, volatile, solid-state cache memory system:
    - replicating the cache data onto the non-volatile, solid-state cache memory system; and
    - redirecting at least one data request concerning the highly-available, volatile, solid-state cache memory system to the non-volatile, solid-state cache memory system.

20. The storage network system of claim 19 wherein the data storage system is configured to perform operations comprising:
- generating a backup copy of the cache data included on the highly-available, volatile, solid-state cache memory system.

21. The storage network system of claim 20 wherein the data storage system is configured to perform operations comprising:
- storing the backup copy of cache data on a non-volatile, electromechanical memory system included within the storage network.

22. The storage network system of claim 20 wherein the data storage system is configured to perform operations comprising:
- suspending JO operations of the storage network during generation of the backup copy of the cache data included on the highly-available, volatile, solid-state cache memory system.

23. The storage network system of claim 20 wherein the non-volatile, electromechanical memory system includes a RAID array.

24. The storage network system of claim 19 wherein the data storage system is configured to perform operations comprising:
- receiving, on the storage network, a write request concerning data to be stored on the storage network; and
- writing the data to the non-volatile, solid-state cache memory system.

25. The storage network system of claim 19 wherein the data storage system is configured to perform operations comprising:
- receiving, on the storage network, a read request concerning data previously stored on the storage network; and
- if available on the non-volatile, solid-state cache memory system, retrieving the data previously stored on the storage network from the non-volatile, solid-state cache memory system.

26. The storage network system of claim 25 wherein the data storage system is configured to perform operations comprising:
- if not available on the non-volatile, solid-state cache memory system, retrieving the data previously stored on the storage network from a non-volatile, electromechanical memory system included within the storage network.

27. The storage network system of claim 19 wherein the non-volatile, solid-state cache memory system includes a flash-based, cache memory system.

* * * * *